J. Whitney,

Dressing Leather,

No. 4,122, Reissued Sep. 13, 1870.

Witnesses:

Robert F. Whitman

Parson A. Kohanes

Inventor:

Joel Whitney

By T. W. Porter

Atty

N. PETERS, PHOTO-LITHOGRAPHER, WASHINGTON, D. C.

United States Patent Office.

JOEL WHITNEY, OF WINCHESTER, MASSACHUSETTS.

*Letters Patent No.* 37,991, *dated March* 24, 1863; *reissue No.* 4,122, *dated September* 13, 1870.

IMPROVEMENT IN MACHINE FOR ROLLING LEATHER.

The Schedule referred to in these Letters Patent and making part of the same

*To all whom it may concern:*

Be it known that I, JOEL WHITNEY, of Winchester, in the county of Middlesex and State of Massachusetts, have invented certain Improvements in Machines for Rolling Leather, of which the following is a specification.

My invention relates, principally, to a combination of adjusting mechanism with a treadle action, so that the distance between the rolls may be graduated, to any extent, by the adjusting devices, as the thickness of the stock to be rolled may require, which shall not interfere with a capability of a limited free movement of one roll toward or away from the other, by the treadle action, to increase or diminish the pressure while the machine is in operation. This is effected by combining, with the treadle and the devices by which one roll is connected therewith and actuated thereby, an adjusting mechanism, upon which the bearings of either roll, as desired, may be directly supported, and by which the roll, thus supported, is adjusted relatively to the other roll, as will be more fully described.

It is this combination which constitutes the essential feature of my invention.

By this construction, the same machine is capable of being used for the expeditious preparation of stock of all degrees of thickness, the distance between the rolls being first graduated to the thickness of the stock by the adjusting mechanism, and the roll actuated by the treadle being forced toward the other during the operation of the machine, to increase the pressure against the leather whenever the condition of particular parts of the stock may require such treatment.

In the accompanying drawing—

Similar letters of reference indicate like parts in the several figures.

In the drawing—

A A denote the standards, which, with cross-beams *a a* and *b b*, constitute the frame of the machine, in which frame the pressure-rolls B B are properly mounted, being journaled in boxes which are capable of a vertical movement between the upright parts of the frame, and are guided therein.

The roll B′ is journaled in boxes *d d*, as shown. These boxes rest upon the vertical sliding rods *e e*, which, in turn, are supported upon the outer ends of the horizontal levers *f f*, which are pivoted upon the pins *g g*, passing through the brackets *h h*, secured upon the frame A A, as shown.

Figure 3:
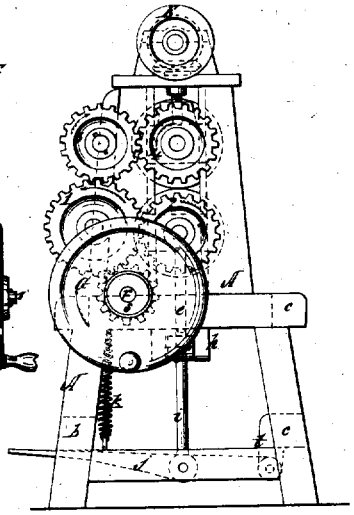
Figure 3 is an end elevation, shown at the right of figs. 1 and 2, the adjusting device here shown being the same as contained in the upper parts of figs. 1, 2, and 3, and the treadle action the same as shown in Figure 4 of my said patent, herewith surrendered.

Two descending rods, *i i*, are, at their upper ends, pivoted to the respective inner ends of levers *f f*, as shown in fig. 3.

Figure 1:
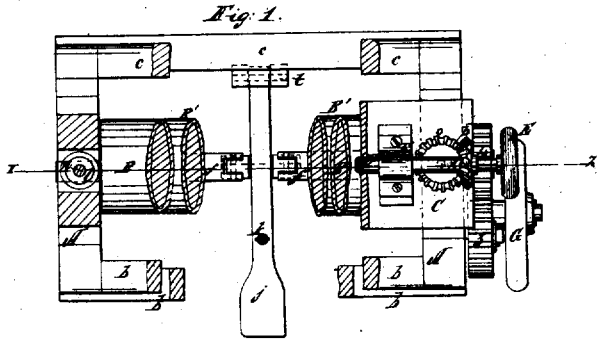
Figure 1 is a top or plan view of my invention.

The lower ends of these rods are pivoted to treadle J, which latter, at its rear end, is pivoted to bracket *t*, secured upon the lower bar *c*, as shown in figs. 1 and 3.

The front or free end of the treadle J, when at rest, bears against the under side of the lower bar, *b*, so that the action of the treadle is confined to the space between this bar and the floor; and, by thus actuating the treadle, the roll B′ will be raised or lowered in a ratio proportionate to the power gained by the compound leverage just explained, the distance which the roll may be raised being small, but the force exerted thereon being great. The treadle and the devices by which it is connected with the roll, as just explained, or equivalent devices, constitute what is termed the treadle action.

Figure 2:
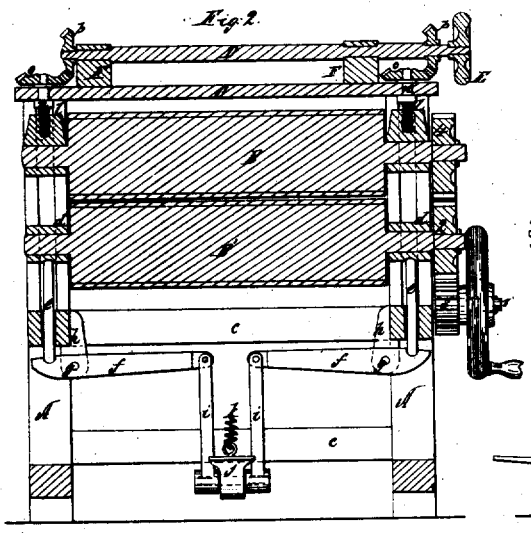
Figure 2 is a longitudinal vertical section, taken on line *y y*, fig. 1.

The adjusting devices are as follows:

The roll B is journaled in sliding boxes *l l*, which latter are suspended upon the screw-rods *n n*, which fit into corresponding screw-nuts in the boxes, as shown in fig. 2. These rods are suspended and revolve in the horizontal bar C, being held from vertical motion by collars, both above and below bar C.

Upon the upper extremity of these rods are rigidly secured bevel-gears *o o*, which mesh into similar gears, *p p*, secured upon shaft D, which revolves in bearings F F upon bar C.

A hand-wheel, E, secured upon shaft D, furnishes the means of rotating the same, whereby, through the action of gears *p p*, *o o*, and screw-rods *n n*, engaging in nuts *l l*, as stated, the roller B may be readily raised or lowered, in order to adjust it relatively to roller B′, so that the limited movement of the latter roller toward the former, by the action of treadle J, as before stated, shall give the required amount of pressure upon any thickness of stock which may be passed between the rolls.

Motion is imparted to the rolls by means of hand-wheel G, or a gear-wheel, or pulley and belt, occupying its place, and revolving in the direction indicated by the arrow thereon.

This wheel revolves upon the short stud *r*, secured in the frame A.

A pinion, *s*, secured to wheel G, engages with a gear-wheel marked 1, which engages with gears 2 and 3, and the latter engages with gear 4. The gears 1 and 4 revolve upon short studs, secured in frame A, while gears 2 and 4 are secured upon the arbors of rollers B and B′, respectively, and, these latter gears being slightly less in diameter than the rollers, therefore, they never engage with each other. It will, therefore, be apparent that, by rotating wheel G, as before described, motion will be imparted to all the gears in the directions indicated by the arrows respectively shown thereon, and the rollers, moving in opposite directions, will sieze upon and pass through between them from the front to the rear of the machine, any substance placed between them.

It will be seen that, by my combination of the treadle action and adjusting devices, the rolls may, by means of the latter, be readily adjusted to any extent which would be impracticable by means of the treadle action, especially where great power in the treadle action was required; and, that the machine, being thus first adjusted, a very limited movement of the treadle suffices to bring its whole force to act on the substance being rolled, regardless of its thickness; and, by reason of this limited movement being sufficient, the increase of power is in the inverse ratio thereto.

The combination of the devices for the general adjustment of one roller toward the other, and the ultimate and independent pressure by the treadle in the same machine, may be accomplished in a variety of ways. Both actions may be imparted successively to the same roll, as is shown in my patent of September 22, 1863, No. 40,069, or the adjustment may be performed upon the lower roll, and the treadle action applied to the upper roll, or both movements may be applied to the upper roll, as may be desired; and, while I do not confine myself to any peculiar manner or method of arranging my combination, yet I do not claim, broadly, and in the abstract, either the adjustment or the treadle action, nor any of the means or appliances employed; but What I do claim as my invention, and desire to secure by Letters Patent, is—

The combination, with the treadle, and mechanism by which the force exerted upon the treadle is imparted to one of the rolls, of mechanism by which one roll may be adjusted with respect to the other roll, independently of the treadle action, whether such adjusting mechanism be arranged to move in conjunction with the treadle, and to act upon the same roll as the treadle, or upon the other roll, substantially as and for the purposes specified.

JOEL WHITNEY.

Witnesses:
T. W. PORTER,
HENRY HYDE SMITH.